United States Patent
Menke

[15] 3,690,594
[45] Sept. 12, 1972

[54] METHOD AND APPARATUS FOR THE DETERMINATION OF COORDINATES

[72] Inventor: Joseph F. Menke, Heidelberg, Germany

[73] Assignee: Eltro GmbH & Co., Heidelberg, Germany

[22] Filed: May 20, 1964

[21] Appl. No.: 369,359

[52] U.S. Cl....................................................244/3.13
[51] Int. Cl..................................................F42b 15/02
[58] Field of Search......244/14 C, 3.13; 250/233, 85, 250/235; 88/24

[56] References Cited

UNITED STATES PATENTS

| | | |
|---|---|---|
| 2,554,188 | 5/1951 | Guanella...........244/14 C UX |
| 2,578,241 | 12/1951 | Guanella...........244/14 C UX |
| 2,942,118 | 6/1960 | Gedance................260/233 X |
| 2,954,555 | 9/1960 | Guttinger et al.....244/14 C X |
| 2,989,640 | 6/1961 | Turck..................244/14 D X |
| 3,239,674 | 3/1966 | Aroyan..................244/14 I X |

*Primary Examiner*—Verlin R. Pendegrass
*Attorney*—Waters, Roditi, Schwartz & Nissen

[57] ABSTRACT

In order for an object in space to locate itself, a beam of electromagnetic radiation is transmitted at it, each cross-sectional element of which beam is modulated by a slotted disc rotating on its axis and at the same time about the axis of the beam. The object receiving one of the elements can thus locate itself relative to the beam axis.

19 Claims, 9 Drawing Figures

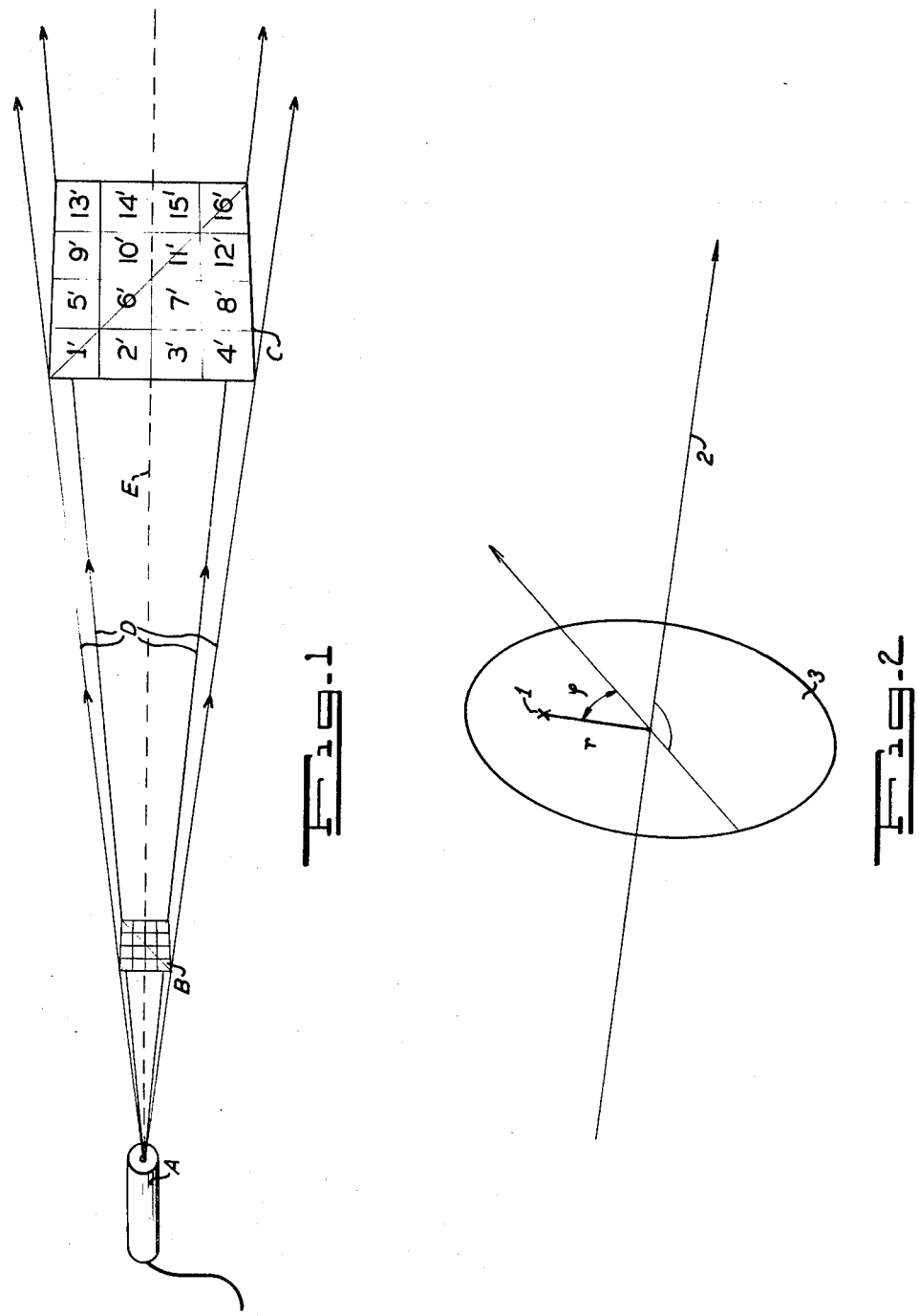

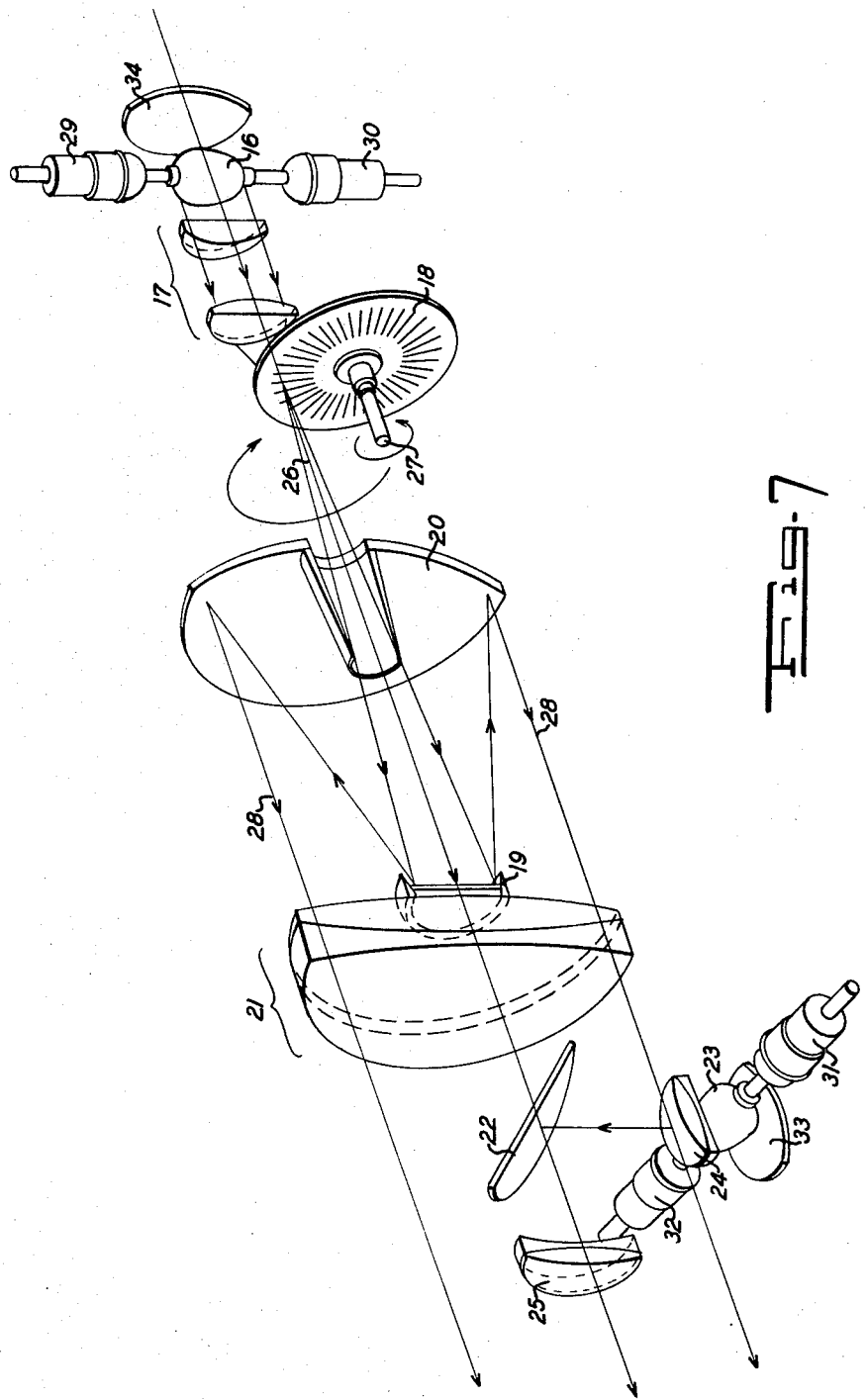

METHOD AND APPARATUS FOR THE DETERMINATION OF COORDINATES

This invention relates to the determination of co-ordinates of an object in space.

More particularly, one aspect of the invention relates to the determination of the co-ordinates of an object within a cross-section of an electromagnetic beam of rays in relation to the axis of the beam of rays whereby, for example, the polar coordinates of the object are to be determined with respect to the center of the cross-section.

In particular the object, when equipped with a suitable receiving system, is capable of measuring its own distance difference co-ordinates with respect to the axis of the beam of rays within which it is locate.

Another aspect of the invention relates to apparatus for carrying out the method as well as to a specific application of the control of a missile by means of electromagnetic radiation, the missile being guided along guide beams.

Heretofore all such methods known were based on the property of electromagnetic radiation transmitting some information values or data to a receiving object. For example, if an object flying in space moves in a beam of rays having a spatial energy distribution, the energy gradient from the receiving system of the object can be utilized for guiding the object in the direction of the ray of maximal energy, the guide-beam. However, this method has the disadvantage in that the receiving system of the object cannot be made sufficiently sensitive to react to small differences in energy, so that the object oscillates too widely or hunts about the guide-beam and is, therefore, inaccurately controlled.

Also known in the art is the control of a missile in a beam of rotating radar rays. However, poor resolution has an adverse effect. Another possibility consists in tracking a missile from the ground and in transmitting control signals to the missile by way of a separate transmission system. However, due to the separation of the receiving and transmitting system, this method is easily susceptible to trouble or interference.

The present invention contemplates determining the coordinates of an object in space, which is always located outside the geometrical boundary of a system and within the cross-section of an electromagnetic beam of rays, in relation to the axis of the beam of rays. There is present, in each cross-section of the beam of rays an image. From the individual image elements the object is able to obtain or deduce unequivocal information about its coordinates at any particular time.

This image is projected into space by the beam of rays in such a manner that each cross-section of the beam of rays represents the same projection of the image. The individual image elements are produced in such a manner that they contain unequivocal information of measured values about the co-ordinates of the object at the location of an image element with respect to the center of the co-ordinates, the image center. The image center is always identical with the center of the cross-section of the beam of rays through which the axis of the beam of rays passes.

The information of measured values is used by the object or by the receiving system thereof for the quantitative determination of its co-ordinates. Suitable for such an image projection is, for example, a modulation disc which rotates in front of a source of radiation. The individual image elements produced thereby correspond to the characterizing quantities of the modulation of the beam of rays.

More particularly, the invention provides for rotating a modulation disc in front of a source of radiation in such a manner that a temporarily-periodically changing portion of the modulation disc is projected as the image. In this case, the portion of the modulation diaphragm which changes temporarily-periodically and is projected as the image, is represented, respectively, by that zone of the modulation disc which is in front of the source of radiation.

The modulation disc rotates eccentrically about the axis of the projecting beam of rays and rotates about its central axis, which extends parallel to the axis of the beam at a suitable distance therefrom. The beam of rays is thereby modulated in a manner known per se with variable frequency, i.e., depending on the position of a point in the beam of rays, it receives a respectively different modulation with a different functionally changing frequency. My application Ser. No. 197,834, filed May 25, 1962 described, in principle, a reversal of the present method, namely, the same modulation of the radiation which in said application proceeds, however, from the image points of an image field.

The image elements produced and projected correspond, in each case, to the characterizing values of said modulation, and the information of measured values of an image element is thus expressed by the maximal frequency swing as a measure for the radial distance difference $r$ from the axis of the beam of rays and by the phase position of the modulation frequency as a measure for the polar angle $\phi$ with respect to an assumed direction of reference.

The information of measured values can be unequivocally utilized by the object located in any beam cross-section at the location of an image element for the determination of its co-ordinates: distance difference, i.e., distance of the object from the axis, and direction. For this purpose, the object includes appropriate receiving and electronic evaluating systems which supply the values of the co-ordinates, for example, a conventional F-M discriminator and a conventional phase comparator.

Other objects, features and advantages of the invention will be apparent from the following detailed description when read with the accompanying drawings which show by way of example, and not limitation, various embodiments of the invention. In the drawings:

FIG. 1 shows, in perspective, a beam of radiation whose cross-section is divided into regions for explaining the theory of the invention;

FIG. 2 shows the polar co-ordinates of a point with respect to the central axis of the beam of FIG. 1;

FIG. 3b shows a frequency-modulated waveform generated by the disc of FIG. 3a;

FIG. 4 shows an alternate embodiment of the modulation disc of FIG. 3a;

FIG. 7 shows apparatus for transmitting radiation in accordance with the invention.

The theory of the invention will now be described with reference first to FIG. 1.

With the aid of a source of light A, image B is projected into space in such a manner that each cross-section, for example, the cross-section C of the beam of rays having a central axis E, represents the same projection of the image B. The individual image elements 1', 2', 3', 4', . . . 16' of the cross-section C, contain such information as is hereinafter explained, that any object located within the cross-section C, for example, a missile, is able to determine from the information, its position with respect to the central axis E.

Each image element 1' to 16' characterizes unequivocally a position with respect to the central axis E which extends through the center of the cross-section C.

Starting from this basic idea, the present invention makes it possible accurately to determine the co-ordinates of an object within a beam of electromagnetic radiation with respect to the axis of the beam of rays.

For example, the problem consists (see FIG. 2) in determining unequivocally the polar co-ordinates $r$ and $\phi$ of an object 1 within the cross-section 3 of a beam of rays with respect to the central axis 2.

Figure 3A:
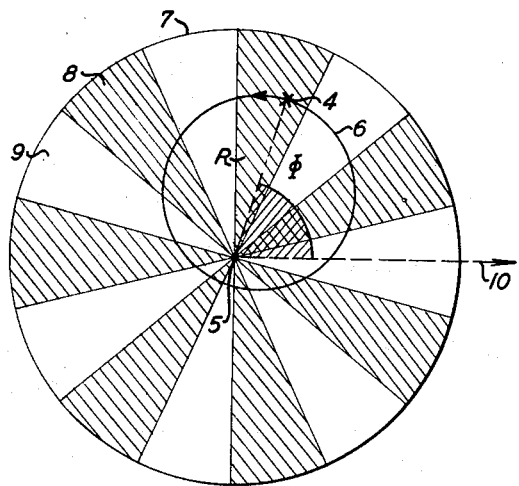
FIG. 3a shows a modulation disc incorporated in the apparatus of the invention.

According to the invention, the problem is solved by using the following facts:

If, as shown in FIG. 3a, a radiant point 4 is modulated by a modulation disc 7 in such a manner that the rotating modulation disc 7 rotates, at the same time, eccentrically about the axis 5, the point 4 travels on an eccentric orbit 6 about the axis 5. The modulation disc 7 comprises, for example, a number of permeable sectors 9 and a like number of impermeable sectors 8.

Figure 3B:
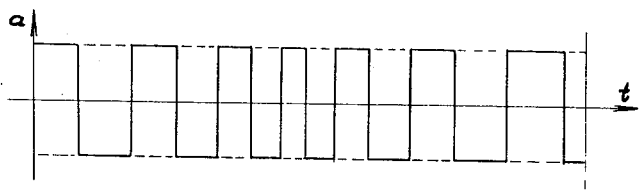

The modulated signal transmitted by the disc 7 then has the form shown in FIG. 3b, where the amplitude $a$ of the modulated signal is illustrated with respect to the time $t$.

There thus results a frequency-modulation based on the eccentric revolution of the modulation disc 7, i.e., the radiation of the point 4 is modulated with a functionally changing frequency.

Each position of the point 4 which, as shown for example, in FIG. 3a, has the polar co-ordinates R and $\Phi$ and an associated characteristic frequency-modulated signal, from which it is possible, in turn, to determine the polar co-ordinates R and $\Phi$.

Figure 4:
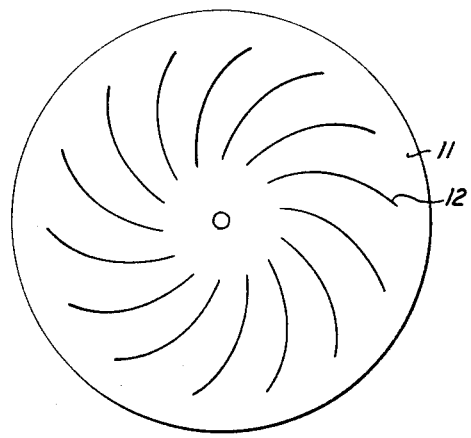

As shown in FIG. 4, such a process may appropriately also be carried out by means of a modulation disc 11, which comprises slots 12 which are permeable to radiation (transmit radiation) and are slightly curved with respect to the periphery of the disc 11.

Accordingly, the invention contemplates that a beam of rays is modulated by means of a modulation disc rotating about its center line and, at the same time, eccentrically about the axis of the beam of rays, so that an image is present in each cross-section of the beam of rays, whose individual image elements convey unequivocal information about the co-ordinates of a point of said cross-section.

This means that a single special image element is produced within the cross-section of the beam of rays, the image element being formed by that frequency-modulation of a ray which impinges on the modulation disc at this place.

Figure 5:
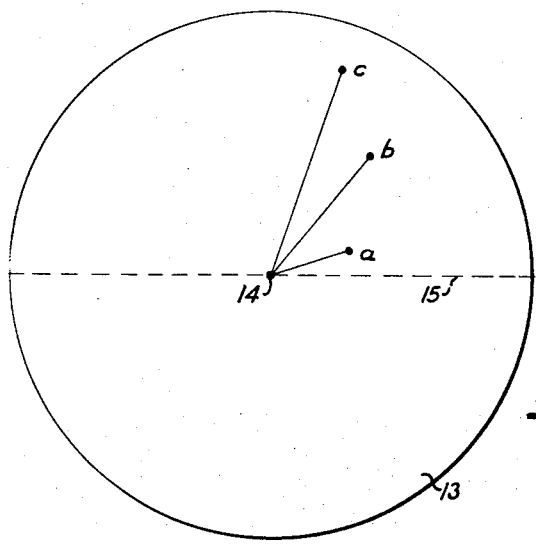
FIG. 5 shows various image points in the cross-section of a projected beam.

FIG. 5 shows, by way of example, three image elements $a$, $b$, and $c$ of the image present in a cross-section 13 of the beam of rays. The three image elements are characterized by different distance differences with respect to the center 14 and by different directional angles with respect to the reference direction 15.

On the basis of the modulation of the beam of rays which projects the image of the three image points $a$, $b$, and $c$ into space, the three image elements are characterized by three different modulation signals.

Figure 6:
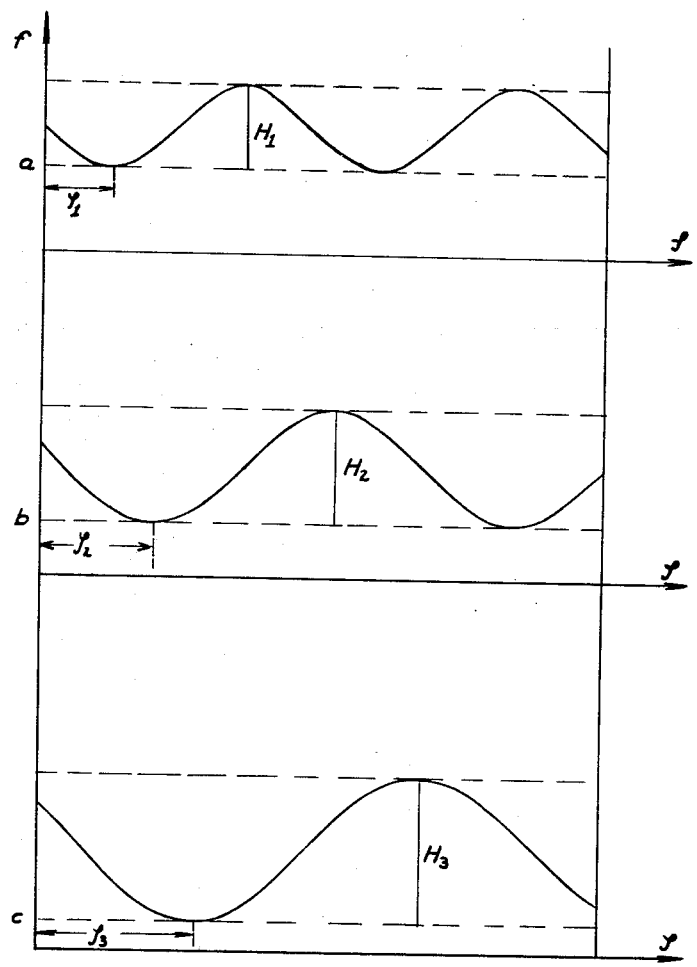
FIG. 6 shows signal waveforms associated with the image points of FIG. 5.

FIG. 6 illustrates the frequencies of the modulation signals corresponding to the image elements $a$, $b$, and $c$ in response to the phase angle $\phi$.

It will be seen that there are three different frequency response curves of the frequency-modulated signals which correspond to the different co-ordinates of the image elements $a$, $b$, and $c$.

The characterizing values of these modulated signals are:

for the image element $a$, maximal frequency deviation $H_1$ and phase $\phi_1$;

for the image element $b$, maximal frequency deviation $H_2$ and phase $\phi_2$; and for the image element $c$, maximal frequency deviation $H_3$ and phase $\phi_3$.

In the final effect the three image elements indicate, in each particular case, these characterizing values, so that the image elements contain unequivocal measured data about the co-ordinates of an object at the location of an image element with respect to the center 14.

The measured data is supplied, in each particular case, by the maximal frequency deviation as a measure for the distance difference $r$ and by the phase with respect to a reference phase as measurement for the polar angle $\phi$. It is, therefore, possible (see FIG. 2) unequivocally to determine the co-ordinates $r$ and $\phi$ of any object located at the site of an image element.

The same is true of each image element of the image located in the cross-section of the beam of rays.

FIG. 7 shows apparatus for carrying out the process according to the invention. The source of radiation is projector 16. The radiation emanating from the projector 16 is focused by the optical system 17. In order to produce the image to be projected, the beam of rays is modulated by means of the modulation disc 18, which rotates eccentrically about the central axis 26 of the beam of rays and which rotates simultaneously about its own axis 27 by conventional means (not shown). Axis 27 rotates about axis 26.

The image produced in this manner is projected into space by the beam of rays 28 with the aid of the optical mirror system 19,20. The optical system 21 produces a parallel beam of rays.

In order to provide an amplitude modulated beam of rays, which is emitted coaxially with the beam of rays projecting the image and is used for phase comparison, there is included an additional projector 23. The radiation from projector 23, after focusing by the optical system 24, is coaxially mirrored into the beam of rays 28 by using the half-silvered mirror 22 and is focused colinear with the beams by rays 28 of the optical system 25.

The power leads 29 and 30 provide electrical energy for the projector 16.

The power leads 31 and 32 provide electrical energy for the projector 23.

Elements 33 and 34 are additional mirrors for amplifying the projector rays.

The polar angle $\phi$ of the image point is determined by the comparison of the phase of the transmitted signal with a reference signal. In order to determine the phase position of the modulation-frequency, it is possible to transmit to the missile or object a comparison signal, which is obtained by an additional amplitude-modulation of the radiation projecting the image. Another possibility consists in determining the phase position of the modulation-frequency by phase comparison with a comparison signal, which is obtained by another amplitude-modulated beam of rays directed at the object. The amplitude-modulated beam of rays is specifically a beam coaxial with the beam of rays projecting the image and may, for example, be radiation of another wavelength. Such a scheme was shown in FIG. 7.

The content of an image element, namely the information of the values or quantities measured, and the amplitude-modulation used for the phase comparison are received by the object and are used to control it. This information can be received by the same receiver, or in the case of different wavelengths, by two different receivers of the object.

Figure 8:
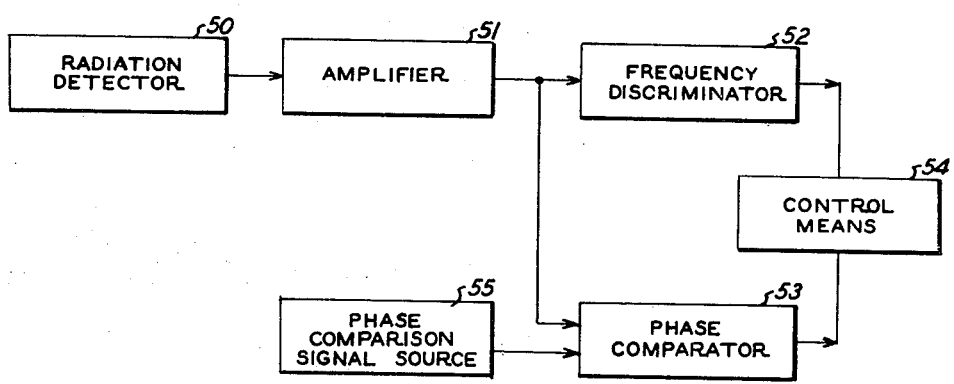
FIG. 8 shows apparatus for receiving and utilizing the radiation transmitted by the apparatus of FIG. 7.

FIG. 8 shows one embodiment of the receiving system in the object or missile to be controlled.

The image element in the beam is detected by radiation detector 50 of conventional design, such as a bolometer, photocell or semi-conductor IR cell and amplified by amplifier 51. The frequency-modulated signal is fed to conventional frequency discriminator 52 which transmits a signal to control means 54, whose amplitude is equal to the radial distance of the object from the central axis of the beam. The frequency-modulated signal is also fed to one input of conventional phase comparator 53, whose other input receives a standard phase comparison signal from source 55. The phase difference of these two signals is measured by phase comparator 53, which transmits a signal representing the polar angle $\phi$ to control means 54. Control means 54, employing conventional servo-systems, converts the received signals to mechanical guidance controls, which direct the object or missile to the central axis of the beam.

The source 55 can take several forms. As indicated above, it may include a separate receiver (radiation detector) and amplifier, or it may include a frequency selective filter and amplifier, with the filter coupled to the radiation detector 50.

Another and very appropriate method of determining polar angle $\phi$ consists in that a comparison phase is produced in the object itself for the determination of the phase position. For the purpose of synchronizing the accuracy of the phase measurement, it is provided that, at specific moments, a comparison be carried out between the comparison phase produced in the object and a predetermined, previously given, phase of the modulation-frequency.

This can be done, for example, by interrupting the projection of the image by the beam of rays for short measuring or test periods, during which a phase transmission to the object takes place, for controlling and, if necessary, readjusting the constancy of the comparison phase produced in the object.

It should be noted that the optical image projection system may comprise infra-red filters, in order to control the missile by means of infra-red radiation. In order to produce the amplitude-modulated beam of rays which is used for the phase comparison and which is radiated coaxially with the beam of rays projecting the image, another projector is provided which is arranged in such a manner that its radiation is emitted in the dead angle of the optical mirror system used, for example, by using an additional mirror system. The amplitude-modulated radiation of the projector is received by the same receiver or by another receiver of the missile. In addition, the radiation may have a different wave-length than the radiation which projects the image. For this purpose, the second projector system comprises a conventional spectral filter.

The receiving system of the missile is equipped with one or more cells, specifically cells sensitive to infra-red radiation.

As already mentioned, there exists the possibility of producing a comparison phase in the missile itself. In such a case, the object or missile is equipped with an oscillator which oscillates, practically phase-locked, with the frequency of the eccentric rotation of the modulation disc. In other words, source 55 is a conventional phase-locked oscillator. It is thus merely necessary for determining the accuracy of measurement to carry out, prior to launching the missile, a comparison between the comparison phase produced in the missile and a predetermined phase of the modulation-frequency. If necessary, the phase supplied by the oscillator can be corrected by means of a phase shifter; this can be effected by a fully automatic electronic connection. In order to control and possibly to readjust the constancy of the comparison phase produced in the missile, it is provided that the projection of the image is interrupted with the aid of appropriate means during the flying time for short tests or measuring periods, during which a phase transmission to the missile takes place. The duty cycle selected may, for example, by 1:10.

In order to prevent the possibility that the missile be located farther away from the axis of the beam of rays, the farther it is removed from the launching place, it is proposed that the focusing of the radiation, i.e., the width of the image projected, be varied with the aid of conventional means. For example, by variation of the focal length of the projecting optical system. For example, the focal length of the radiation-focusing optical projection system can be varied linearly with the flying time. This insures that the missile is guided to the target with maximum accuracy in the final phase.

The method according to the invention is especially distinguished by high accuracy of measurement for the determination of the co-ordinates, and it can be applied wherever it is possible to produce the protection of the image, from whose individual image elements an object moving or located in the cross-section of the projecting beam of rays is able to determine its co-ordinates with respect to the axis of the beam.

In addition to using the method for controlling a missile, it may also be used, for example, for the landing of an aircraft, in cases in which an aircraft is guided along the guide-beam with maximum accuracy to the landing strip. The method is also extremely suitable for general problems of measurement.

What is claimed is:

1. A method for the self-determining of the coordinates of an object with respect to an axis, said method comprising the steps of aiming a beam of electromagnetic radiation along said axis the beam being of sufficient cross-sectional dimension as to encompass said object, said beam including a plurality of cross-sectional elements, frequency modulating said beam to provide the same with measurable characteristics and such that in each cross-sectional element of said beam there are measurable characteristics identifying the element, and detecting as a signal, at said object, the measurable characteristics of the element whereat the object is located, to determine its position with respect to said axis; said frequency modulating step comprising rotating a modulation disc with a light permeable pattern therein in front of a source of said radiation; said modulation disc being eccentrically rotated about the axis of the beam and rotated about its own central axis which is parallel to the axis of the beam, so that the beam of rays is modulated with variable frequency, whereby the individual elements correspond to characterizing quantities of the modulation and the information of the measurable characteristics is, at maximal frequency shift, a measure of the radial distance difference of said object from said axis of the beam and, by the phase position of the modulation frequency, a measure of the polar angle.

2. A method according to claim 1 further comprising the step of comparing the phase of the modulation of the projected portion.

3. A method according to claim 1 further comprising the step of phase comparing the phase of the element signal with a comparison signal obtained by an additional amplitude-modulated beam of rays directed at the object.

4. A method according to claim 3, wherein the amplitude-modulated beam of rays, which is used for phase comparison and is directed at the object, is a beam coaxial with the first said beam.

5. A method according to claim 3, wherein the amplitude-modulated beam of rays, used for phase comparison, is radiation having a wavelength different from the radiation of the first said beam.

6. A method according to claim 3, wherein the content of the received element from the first said beam and the amplitude modulation used for the phase comparison is received by a common receiver in the object.

7. A method according to claim 3, wherein the amplitude-modulated beam of rays used for the phase comparison and the first said beam are received by different receivers in the object.

8. A method according to claim 1 further comprising the step of phase comparing the element signal with a signal generated in the object for determining the phase position of the modulation frequency.

9. A method according to claim 8, wherein a comparison between the comparison phase produced in the object and the specific predetermined phase of the modulation frequency is effected.

10. A method according to claim 9, wherein projection of the first said beam of rays is interrupted for short periods, during which a reference phase signal is generated for controlling the constancy of the comparison phase produced in the object.

11. A method according to claim 1, wherein the object is a missile including a control system and, when the missile deviates from the axis of the first said beam, the measurable characteristics of the elements are converted to control signals fed to said control system to guide said missile in the direction of the axis of the beam of rays.

12. Apparatus for use in determining the coordinates of a remote object with respect to an axis comprising a source of radiation toward said modulating disc at said source and means for projecting the image of said modulating disc in a beam along the first said axis.

13. Apparatus according to claim 12, wherein said projecting means is an optical mirror system.

14. Apparatus according to claim 12, wherein said modulation disc is a circular disc with permeable slots and impermeable webs.

15. Apparatus according to claim 12 including an infrared filter in said projecting means.

16. Apparatus according to claim 12 including a second projecting means for transmitting a beam of radiation coaxial with said image beam.

17. Apparatus according to claim 16, wherein said second projecting means includes a spectral filter.

18. Apparatus according to claim 12 further comprising in said object a receiving system including at least one infrared-sensitive detector.

19. Apparatus according to claim 12 further comprising in said object an oscillator which oscillates in substantially phase-locked relationship with the frequency of rotation of said modulation disc for supplying indicia for comparison with the projected radiation.

* * * * *